(12) United States Patent
Pfeiffer et al.

(10) Patent No.: US 12,281,885 B2
(45) Date of Patent: Apr. 22, 2025

(54) IGNITER FOR PASSENGER PROTECTION DEVICES AND METHOD FOR PRODUCING SAME

(71) Applicant: SCHOTT AG, Mainz (DE)

(72) Inventors: Thomas Pfeiffer, Kumhausen (DE); Stanislav Relich, Horni Bojanovice (CZ); Michal Chromec, Lanskroun (CZ)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 17/976,524

(22) Filed: Oct. 28, 2022

(65) Prior Publication Data
US 2023/0047377 A1     Feb. 16, 2023

Related U.S. Application Data

(63) Continuation of application No. PCT/EP2021/059637, filed on Apr. 14, 2021.

(30) Foreign Application Priority Data

Apr. 28, 2020  (DE) ............... 20 2020 102 354.3
Apr. 28, 2020  (EP) .................... 20171737

(51) Int. Cl.
*F42B 3/11* (2006.01)
*B60R 21/26* (2011.01)
(Continued)

(52) U.S. Cl.
CPC ............ *F42B 3/11* (2013.01); *B60R 21/26* (2013.01); *C23C 10/00* (2013.01); *C23C 28/023* (2013.01);
(Continued)

(58) Field of Classification Search
CPC ......... C23C 10/00; C23C 28/023; C25D 3/48; C25D 5/34; B60R 21/26; F42B 3/11; F42B 3/195
See application file for complete search history.

(56) References Cited

U.S. PATENT DOCUMENTS 1,813,906 A    7/1931  Caron
3,274,937 A    9/1966  Kyle
(Continued)

FOREIGN PATENT DOCUMENTS

AT       513238       7/2014
CN     201813435      4/2011
(Continued)

OTHER PUBLICATIONS

English translation of Written Opinion of the International Searching Authority dated Jul. 15, 2021 from PCT/EP2021/059637, 7 pages.
(Continued)

*Primary Examiner* — Bret Hayes
(74) *Attorney, Agent, or Firm* — Ruggiero McAllister & McMahon LLC

(57) ABSTRACT

An igniter of a passenger protection device has at least one metal pin for contacting the tripping unit of the passenger protection device. The metal pin has a contact end that can be coupled to the tripping unit. The metal pin has a gold coating with a layer thickness. A maximum layer thickness is present at a distance of at least 1 mm from the contact end.

15 Claims, 4 Drawing Sheets

(51) Int. Cl.
  *C23C 10/00* (2006.01)
  *C23C 28/02* (2006.01)
  *C25D 3/48* (2006.01)
  *C25D 5/34* (2006.01)
  *F42B 3/195* (2006.01)

(52) U.S. Cl.
  CPC ............... *C25D 3/48* (2013.01); *C25D 5/34* (2013.01); *F42B 3/195* (2013.01); *B60R 2021/26029* (2013.01)

(56) References Cited

U.S. PATENT DOCUMENTS

| | | | |
|---|---|---|---|
| 5,345,872 | A | 9/1994 | Takahashi |
| 8,978,557 | B2 | 3/2015 | Hartl |
| 2004/0216631 | A1 | 11/2004 | Fink |
| 2006/0222881 | A1 | 10/2006 | Fink |
| 2007/0187934 | A1 | 8/2007 | Fink |
| 2010/0064923 | A1 | 3/2010 | Fink |
| 2010/0199872 | A1 | 8/2010 | Fink |
| 2015/0107477 | A1 | 4/2015 | Heigl |
| 2019/0109071 | A1 | 4/2019 | Hartl |
| 2019/0383589 | A1* | 12/2019 | Boutin .................... F42B 3/198 |
| 2021/0140745 | A1* | 5/2021 | Pfeiffer ................... C03C 27/02 |

FOREIGN PATENT DOCUMENTS

| | | |
|---|---|---|
| CN | 109017667 | 12/2018 |
| DE | 102006056077 | 5/2008 |
| DE | 102012009765 | 11/2013 |
| DE | 102014219124 | 3/2016 |
| DE | 102015207488 | 10/2016 |
| DE | 102017123278 | 4/2019 |
| EP | 1455160 | 9/2004 |
| EP | 1491848 | 12/2004 |
| EP | 1710532 | 10/2006 |

OTHER PUBLICATIONS

English translation of the International Preliminary Report on Patentability dated Oct. 27, 2022 from PCT/EP2021/059637, 8 pages.
ASTM B735-16, "Standard Test Method for Porosity in Gold Coatings on Metal Substrates by Nitric Acid Vapor[1]" 2022, 4 pages.
ISO 19072-1, "Road vehicles—Connection interface for pyrotechnic devices, two-way and three-way connections—Part 1: Pocket interface definition", Jun. 15, 2014, 16 pages.
English translation of International Search Report dated Jul. 15, 2021 from PCT/EP2021/059637, 2 pages.

* cited by examiner

IGNITER FOR PASSENGER PROTECTION DEVICES AND METHOD FOR PRODUCING SAME

CROSS-REFERENCE TO RELATED APPLICATIONS

This application is a continuation of International Application No. PCT/EP2021059637 filed Apr. 14, 2021, that claims priority under 35 USC § 119 to European Patent Application No. 20171737.8 filed Apr. 28, 2020, and German Patent Application No. 202020102354.3 filed Apr. 28, 2020, the entire contents of all of which are incorporated herein by reference.

BACKGROUND OF THE DISCLOSURE

1. Field of the Disclosure

The present disclosure relates to an igniter for passenger protection devices. Such devices in accordance with this disclosure are, in particular, airbags and/or seatbelt tensioners and/or buckle tensioners, pedestrian protection systems, here in particular pyrotechnic actuators for active hinges or active buckles, for example, occupant protection systems, in particular active headrests and/or steering columns, and/or battery separators. The igniters are subjected to high pressures. The igniter comprises at least one metal pin or contact pin with a contact end. Furthermore, the disclosure also describes a method for producing an igniter having a metal pin.

2. Description of Related Art

Contact pins or metal pins for feedthroughs, in particular metal sealing-material feedthroughs, which find use in igniters, are already known in various designs from the prior art.

Metal sealing-material feedthroughs are understood to mean vacuum-tight fusions of sealing materials, in particular those made of glasses, glass ceramics, or plastics in metals. In this case, the metals serve as electrical conductors. Reference is made here to U.S. Pat. No. 5,345,872 A and 3,274,937 A by way of example. Feedthroughs of this kind are widespread in electronics and in electrical engineering. The material used for fusion, in particular glass, serves here as an insulator. Typical metal sealing-material feedthroughs are constructed in such a way that metallic inner conductors, in particular metal pins or contact pins, are fused into a preformed sintered glass part, whereby the sintered glass part or the glass tube is inserted into an outer metal part with the so-called base body, which is formed from a ring-shaped or plate-shaped element. Regarded as preferred applications of metal sealing-material feedthroughs of this kind are, for example, ignition devices. Among other things, these are used for passenger protection devices, in particular airbags or seatbelt tensioners, in motor vehicles. In this case, the metal sealing-material feedthroughs are a component part of an ignition device. The entire ignition device or the igniter comprises, besides the metal sealing-material feedthrough, an ignition bridge, the explosive agent, and a metal covering, which tightly encloses the ignition mechanism. Either one or two metal pin(s) or contact pin(s) or more than two metal pins or contact pins, in particular metal pins, can be inserted through the feedthrough. In an especially preferred embodiment with a metallic pin, the housing is grounded and, in a preferred two-pole embodiment, is grounded on one of the pins.

Known from US Pub. No. 2006/0222881 A1, US Pub. No. 2004/0216631 A1, EP 1455160 A1, US Pub. No. 2007/0187934 A1, and U.S. Pat. No. 1,813,906 A are metal sealing-material feedthroughs, in particular for igniters of airbags or seatbelt tensioners, which are characterized in that the through-opening for the contact pins, in particular for metal pins, is punched out of the base body. In accordance with US Pub. No. 2007/0187934 A1, during the production of the base body from a strip material with a thickness in the range between 1 mm and 5 mm, preferably 1.5 mm and 3.5 mm, in particular between 1.8 mm and 3.0 mm, most especially preferred between 2.0 mm and 2.6 mm, the openings are punched through the entire thickness of the base body by means of the punching process.

The metal pin or contact pin, in particular the metal pin in the sealing material, is embedded or glazed in the entrance opening punched in the base body over the entire thickness of the base body that lies in the above-mentioned region.

Furthermore, the through-opening for the feedthroughs with more than one pin is arranged off-center in accordance with US Pub. No. 2007/0187934 A1.

The punching from a sheet metal material in accordance with US Pub. No. 2007/0187934 A1 has a large number of drawbacks. One drawback lies in the fact that, in the case of punching from a strip material, such as, for example, a sheet metal of the base body, a large amount of material waste is created.

Known from DE 102006056077 A1 is an ignition apparatus for a pyrotechnic protective apparatus, which has a casing for positioning in place the current feedthrough of the metal pin and a means for preventing any relative movement between the casing and the metal pin. In DE 10 2006056 077 A1, too, as in the case of US Pub. No. 2007/0187934 A1, the base body is punched from a sheet metal, such as, for example, a strip material, thereby entailing a large amount of material waste. Furthermore, as in US Pub. No. 2007/0187934 A1, the feedthrough openings were arranged off-axis.

EP 1491848 A1 shows a current feedthrough with a centrally arranged through-opening for a pin-shaped conductor. The through-opening is not described in terms of its method of production and extends over the entire thickness of the base body.

Known from U.S. Pat. No. 8,978,557 B2 is a ring-shaped, plate-shaped element for a seatbelt tensioner and/or airbag igniter with a relief region, for which the through-opening is introduced by punching. The feedthrough component with the ring-shaped, plate-shaped element comprises two metal pins, whereby, in U.S. Pat. No. 8,978,557 B2, no information is provided as to how the metal pins are produced.

DE 102017123278 A1 shows a base body for feedthrough elements, comprising a metallic base body, at least one through-opening for receiving a functional element in a sealing material, in particular an electrically insulating sealing material, and at least one conductor, which is connected to the base body through a solder connection. The solder connection comprises a metallic soldering material, whereby the metallic soldering material covers a surface region of the base body and thus forms a soldered region on a surface of the base body. The base body has, at least in the soldered region, a microstructuring that comprises at least depressions in the surface of the base body.

Known from AT 513238 B1 is a method for producing an igniter for pyrotechnic systems. The contact pin that is used in AT 513238 B1 is characterized by being rounded.

US Pub. No. 2010/199872 A1 shows a feedthrough into which two metal pins are glazed. The metal pins known from US Pub. No. 2010/199872 A1 can be gold-coated at least in their end region. No statements are made in US Pub. No. 2010/199872 A1 on the thickness of the gold layer.

Known from EP 1710532 A1 is a feedthrough for a pyrotechnic device having two metal pins.

DE 102012009765 A1 shows an igniter for a gas generator of a motor vehicle safety system with at least two contact pins, which are separated spatially from one another by an electrically insulating ground, wherein each contact pin is furnished with a chlorine-free gold coating. The gold coating can be introduced in a galvanic process, whereby chlorine scavengers are introduced in a cleaning solution used in a preceding cleaning step.

In DE 102017123278 A1 and DE 102012009765 A1, it is not disclosed how the conductors or contact pins are produced.

Disclosed in DE 102014219124 A1 is a triggering device for a passenger protection device having at least one metal pin, wherein the metal pin has a gold coating with an unspecified layer thickness. The metal pin comprises a conductor that is glazed into an opening of the feedthrough, whereby the conductor comprises an end region that is coated with gold.

DE 102015207488 A shows a flat electrical contact pin for a plug connector contact. This flat contact pin is likewise furnished with a gold coating. A contact tongue with a maximum layer thickness of the coating is designed to be at a distance from the tip of the contact pin. In this case, the maximum layer thickness of the contact region is designed to be at a distance of between 1.6 mm and 5.5 mm from the tip. In DE 102015207488 A, the gold layer is applied to the flat electrical contact pin by use of a tampon galvanization method or a brushing galvanization method. In this method, a sponge or a nonwoven fabric is employed to apply the gold layer. A drawback of the method known from DE 102015207488 A for applying the gold layer was that this kind of application was not possible in the case of metal pins of rounded shape.

SUMMARY OF THE DISCLOSURE

Particularly in the case of metal sealing-material feedthroughs with two contact pins, in particular metal pins and through-openings arranged off-center, the off-center through-opening leads to a weakening of the glazing. In the prior art, the contact pins, in particular the metal pins for feedthroughs, in particular glass-metal feedthroughs, were coated with a gold layer essentially over the entire length of the metal pin. In order to provide for an adequate conductivity, this gold layer was designed to be as thick as necessary for an adequate conductivity and a secure contact for use in a plug connector, for example. This leads to a very high use of material and accordingly to high costs.

The object of the disclosure is to avoid the drawbacks of the prior art and to provide an igniter or a feedthrough for an igniter having a contact pin, in particular a metallic contact pin, for feedthroughs, in particular metal sealing-material feedthroughs, which avoids these drawbacks.

In accordance with the disclosure, this is achieved by an igniter or a feedthrough for an igniter of a passenger protection device according to the present disclosure.

The igniter comprises at least one metal pin or contact pin with a contact end, which can be coupled to a tripping unit, wherein, in accordance with the disclosure, the metal pin is characterized by a gold coating of a layer thickness D and the layer thickness D of the gold coating is present at a distance of at least 1 mm from the contact end. The gold coating that is present at a distance of more than 1 mm has a layer thickness that provides an adequate electrical conductivity for a coupling to a tripping unit.

Preferably, the metal pin is not flat, but rather round in design. Preferably, the gold layer is applied on the essentially round metal pin not by a brushing method or a galvanizing method, but rather, optionally, by an electrolytic deposition method by use of blend techniques if desired.

In an especially preferred embodiment, the at least one metal pin can be coupled to the tripping unit at a distance from the contact end by means of contact surfaces, in particular by means of contact surfaces of a plug connector. The maximum layer thickness of the gold layer is present, in accordance with the disclosure, in a region against which the contact surfaces rest against the metal pin in the operating state. Coating the metal pin with a layer thickness, such as, for example, the Au layer thickness that is necessary for contact only in the region in which the metal pin actually experiences contact results in a substantial material savings. This selective coating can be achieved by corresponding maskings in the unit used for application of the gold coating.

The application of the gold coating in accordance with the disclosure by means of an electrolytic deposition method using blend techniques is characterized by a high selectivity. Preferably, the layer thickness increases up to the maximum layer thickness that is needed to achieve secure contacting with an adequate conductivity.

The maximum layer thickness of the coating is present preferably in a plateau region, in which the layer thickness varies by at most 40% in relation to the maximum layer thickness, in particular by at most 20% or by at most 10%.

In order to provide a secure electrical contact between the components, such as, for example, plug connectors, coupled to the metal pin over the contact surface with the gold coating, it is preferred when the maximum layer thickness D is between 0.20 µm and 0.80 µm, in particular between 0.40 µm and 0.70 µm or approximately 0.60 µm.

Because the metal pin is coated in its entirety and, in accordance with the disclosure, not only in the region that electrically contacts a plug connector, the thickness of the gold layer outside of the contact region, which is to be equated to the plateau region, such as, for example, at the contact end, is less than 0.20 µm, in particular between 0.05 µm and 0.20 µm.

Preferably, the length of the metal pin is more than 7 mm and the layer thickness of the gold layer at a distance of 7 mm from the contact end is more than 0.15 µm, in particular more than 0.20 µm, in particular between 0.15 µm and 0.35 µm.

With layer thicknesses of less than 0.8 µm in the region of the maximum layer thicknesses, it is possible, in particular, to save much material, in particular coating material. Furthermore, it is possible by means of electrolytic deposition of the gold layer in accordance with the disclosure, for example, to obtain very thin, homogeneous, and continuous gold layers, which, in particular, also meet the requirements in regard to porosity in accordance with ASTM B735 from ISO 19072-1.

A further advantage of the application of the gold layer by electrolytic deposition is that the layer can be applied in a single operating step. This is in contrast to DE 102015207488 A1, where a plurality of coating steps, such as, for example, tampon galvanization in combination with further galvanization methods, are necessary.

In an alternative embodiment, the metal pin can have a length of more than 7 mm, in particular of 7 mm to 12 mm, preferably of 9 mm. The plateau region of the coating in accordance with the disclosure begins at a distance of 1 mm to 4 mm from the contact end, in particular at a distance of 2 mm to 6 mm, preferably 3 mm to 5 mm.

It is preferred when the plateau region ends at a distance of 5 mm to 10 mm from the contact end, in particular at a distance of 5.5 mm to 7.5 mm or 5.8 mm to 7 mm.

For a good electrical contact, it is advantageous when the plateau region has a length P of between 2 and 6 mm, in particular of between 3 mm and 5 mm. Preferably, the length of the plateau region is 3.5 mm to 4.5 mm. The plateau region with the length P thereby characterizes the region against which the contact surface of the plug connector, for example, is applied.

Preferably, the layer thickness of the gold layer increases from the contact end towards the plateau region, in particular with a slope of 0.1 µm to 0.3 µm, preferably 0.25 µm per mm, to a layer thickness of 0.5 to 0.65 µm in the plateau region.

The igniter is preferably characterized in that the at least one metal pin is arranged in a sealing material of a metal sealing-material feedthrough with a base body or is connected to the base body in an electrically conductive manner, in particular by way of a solder connection or by way of a weld connection. Preferably, the base body comprises an opening in which a metal pin with a gold coating in accordance with the disclosure can be glazed into a glass material and/or a glass ceramic material. If the coefficient of thermal expansion $\alpha_{basebody}$ of the base body is greater than that of the glass material $\alpha_{glass}$, then a pressure glazing with a tightness of $1 \cdot 10^{-8}$ mbar l/s at 1 bar pressure difference is made possible. Preferably, prior to application of the gold layer, another metal, preferably nickel, is diffused into the metal pin.

In addition to the igniter, the disclosure also provides a method for producing an igniter/airbag having a metal pin that is furnished with a gold layer. The diffusion of nickel results in a better adhesion of the subsequently applied gold layer. Furthermore, the diffused nickel results in an increase in corrosion resistance, in particular that of the coated pin.

The igniters according to the disclosure are employed advantageously in passenger protection devices chosen from the group consisting of airbags and/or seatbelt tensioners and/or buckle tensioners and/or pyrotechnic actuators and/or active hinges and/or active buckles and/or active headrests and/or active steering columns and/or battery separators.

The disclosure will be described below on the basis of figures by way of example, without any limitation.

DETAILED DESCRIPTION OF THE DISCLOSURE

Figure 1:
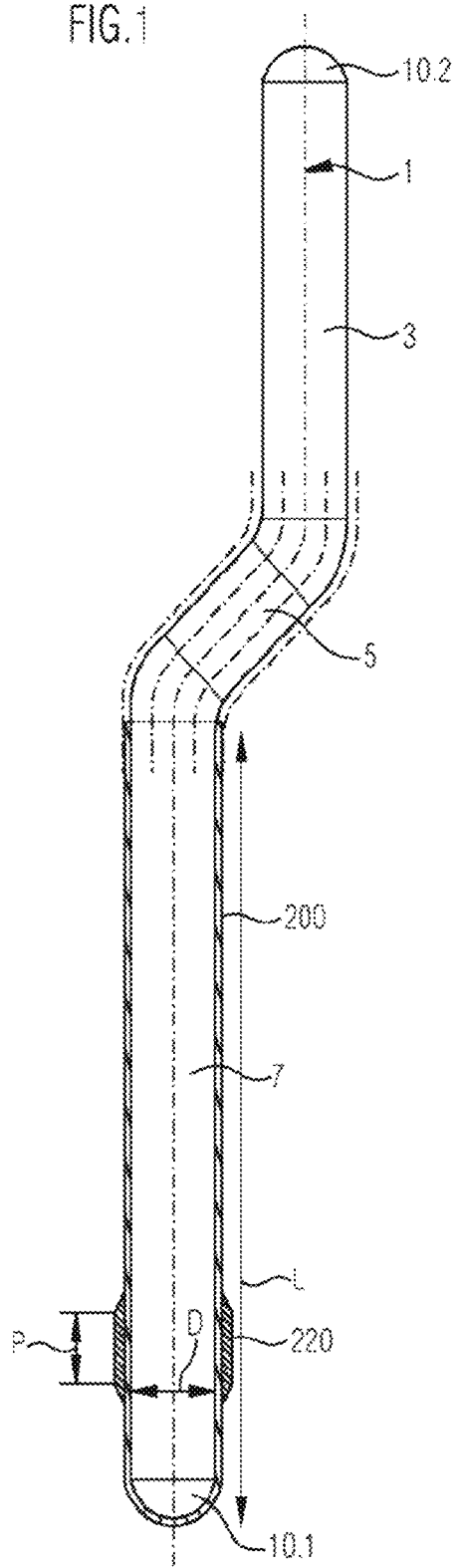
FIG. 1 shows a metal pin according to the disclosure with a gold coating.
Figure 2:
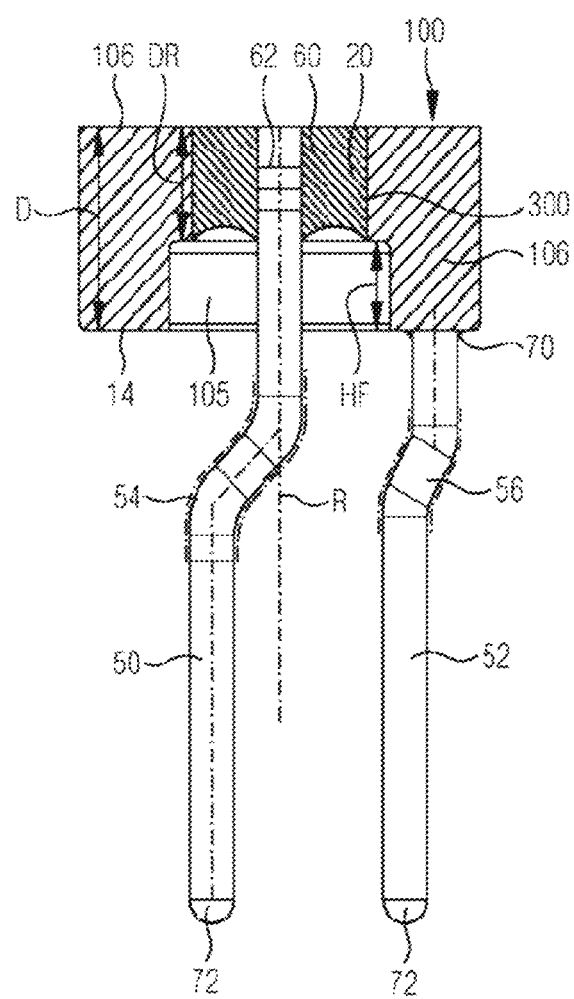
FIG. 2 shows a feedthrough for an igniter having a metal pin with a gold coating.
Figure 3:
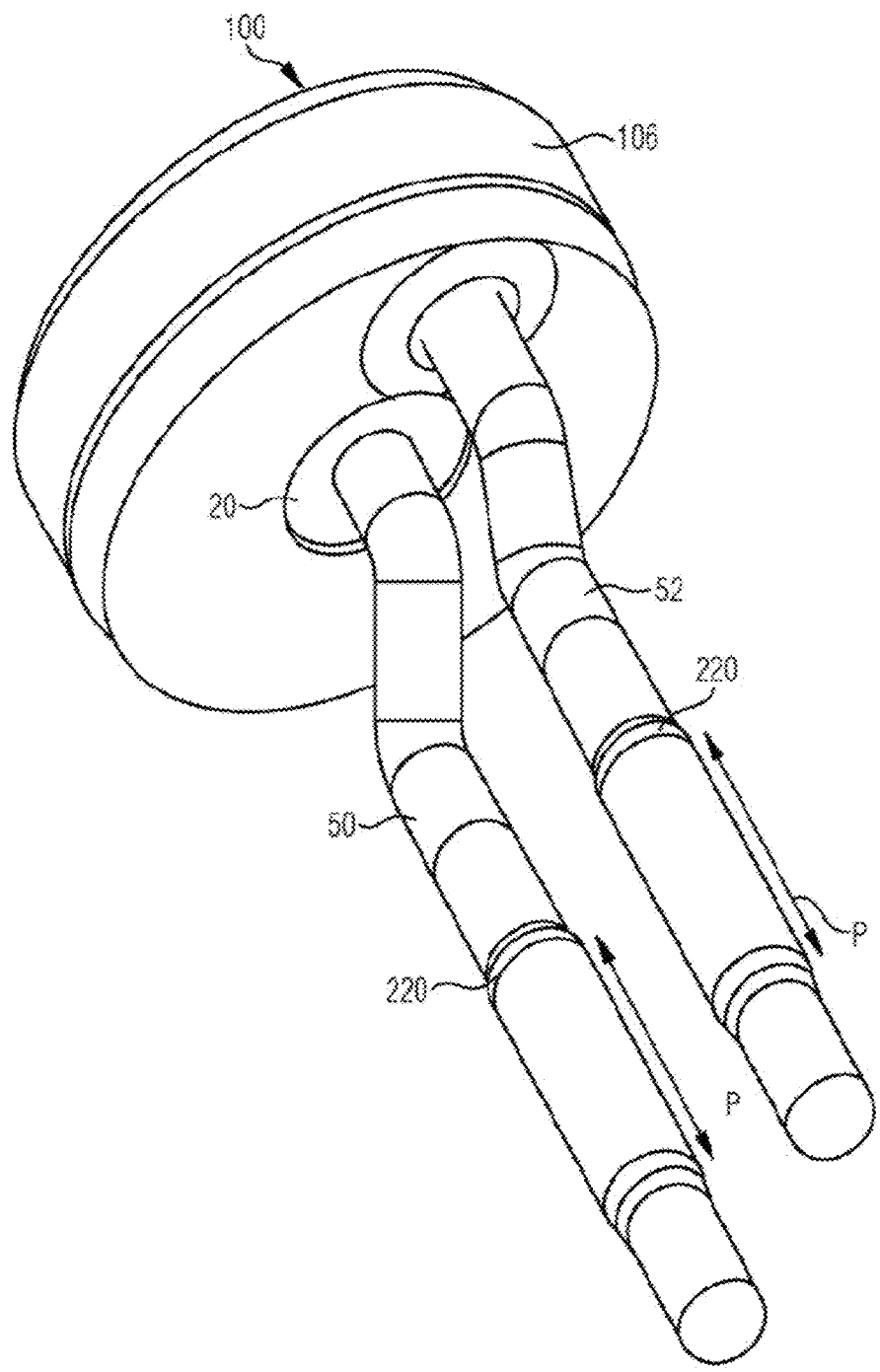
FIG. 3 shows a feedthrough for an igniter having a round metal pin with a gold coating in 3-dimensional view.
Figure 4:
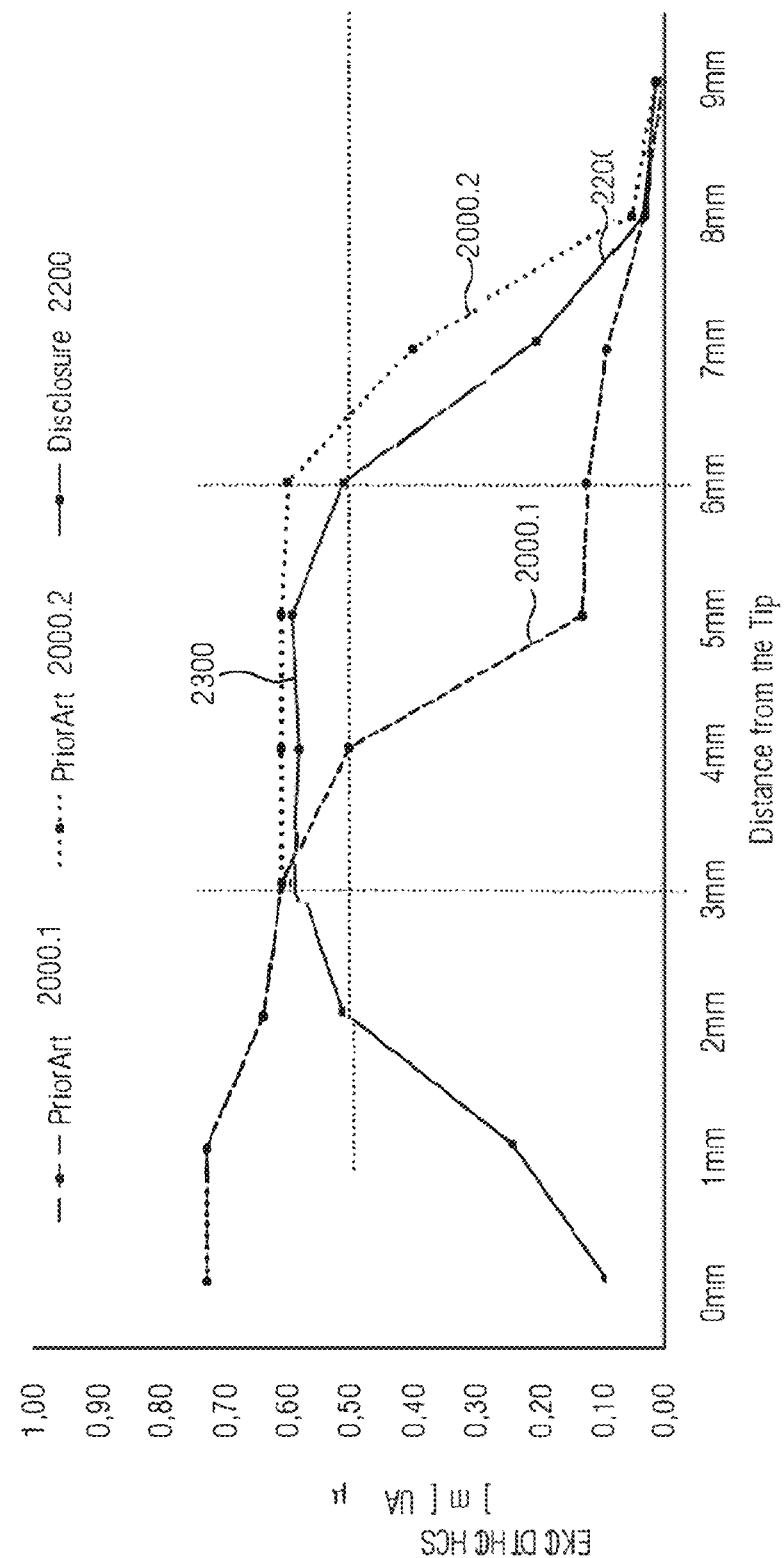
FIG. 4 shows a plot of the thickness of the gold coating along the length L of the metal pin.

FIG. 1 shows, by way of example, a contact pin with a gold coating 220, such as is used in an igniter, in particular in a feedthrough for an igniter in accordance with the disclosure. In the embodiment depicted in FIG. 1, the contact pin 1 comprises, by way of example, three regions: a first, essentially straight region, which is labeled with the reference number 3, a curved region, which is labeled with the reference number 5, and an end region or end section, which is labeled with the reference number 7. The end sections 10.1, 10.2 of the pin 1 are rounded by way of non-material-removing and/or material-removing methods, for example, whereby the radius R of the rounding is predetermined. The end section 10.1 is the contact end of the metal pin at a tripping unit of an igniter. The radius R of the rounding can be 0.5 mm and the diameter D of the contact pin can be 1 mm, for example. By way of non-material-removing and/or material-removing methods, it is possible to adjust a predetermined radius that is preferably half of the diameter of the cylindrical part of the contact pin. The section 200 that is furnished with the gold layer 220 with a thickness of 0.5-0.65 µm is part of the end section 7 of the metal pin. The gold layer 220 with a thickness of 0.5-0.65 µm represents, in the plateau region, the contact surface to other electrical devices, such as, for example, plug connectors. The length L of the section 200 of the end section 7, which receives the gold layer 220 with a thickness of 0.5-0.65 µm, is labeled with L. The length L of the section 200 of the metal pin is preferably 7 to 12 mm. The region 220 that is coated with the gold layer begins preferably at a distance of 1 mm to 4 mm from the contact end, which, in the present case, corresponds to the end section 10.1. The plateau portion of the region 220 has a length P. A profile of the metal pin as a function of the length L of the section 200, which also shows the plateau region, is depicted in FIG. 4. The contact pins or metal pins are obtained by cutting from a portion of wire. The non-straight, that is, curved section 5 of the pin is inclined at angle of 45° with respect to the straight region 3 and the end section 7. The diameter D of the pin is, for example, between 0.5 and 2.5 mm. Pins with diameters smaller than 0.5 mm are possible. FIG. 1 is essentially a basic principle and schematic view. In contrast to this, FIG. 3 shows an embodiment of a metal pin such as is realized at the present time. Depicted in FIG. 2 is the use of a contact pin according to the disclosure, in particular a metal pin, in a feedthrough for an igniter of a passenger protection device. FIG. 2 shows a feedthrough 100, in particular a metal sealing-material feedthrough for devices that are subject to high pressures, such as, for example, airbags or seatbelt tensioners as well as, in general, passenger protection devices.

Clearly seen is the feedthrough 100, comprising a ring-shaped element 106 with an opening. Further shown is a relief region 105. Punched out of the residual material of the ring-shaped element 106 with the thickness DR is a through-opening 20, which, in the present case, has a conical course 300. Whereas, in the exemplary embodiment shown, the conicity is introduced over the entire length of the through-opening, it is possible in an alternative embodiment for the conicity to extend only over a part of the length of the through-opening; that is, the feedthrough opening then has two sections, a conical section and a non-conical section adjoining it. The conical section can then be produced, for example, by reshaping or forming and the non-conical section can be produced by punching.

The ring-shaped or plate-shaped element 106 serves as a base for a metal sealing-material feedthrough with a total of two contact pins 50, 52 with a coating in accordance with the disclosure. In accordance with the disclosure, both the contact pin 50 and the contact pin 52 are, as depicted in FIG. 3, coated at least over a part of the length L at least with gold (Au) for better contacting. The coating of the pins 50, 52 is not explicitly depicted in FIG. 2 in contrast to FIG. 1.

Whereas the contact pin, which is preferably a metal pin 50, is passed through a sealing material 60, which, in this case, is a glass material, but which can also be a glass ceramic material or a ceramic material, from the front side to the back side in a manner that is insulated with respect to the ring-shaped or plate-shaped base body 106, the second contact pin, in particular, the metal pin 52, serves as a ground pin. The ground pin can also be gold-coated.

As a ground pin, the second metal pin 52 is connected directly to the ring-shaped or plate-shaped element 106. Both the contact pin, in particular the metal pin 50, and the contact pin, in particular the metal pin 52, are curved in design. The curve in the conical metal pins is marked 54 or 56 and is clearly seen.

The contact pin, in particular the metal pin 50, can additionally be furnished with means 62 at the metal pin 50 itself that engages in the glass plug connector and thereby prevents the metal pin from being pressed out of the glass plug connector 60, in which the metal pin is glazed, even at high pressures.

The glazing of the contact pins, in particular the metal pin 50, into the sealing material 60 is conducted by fusion. Once the contact pin, in particular the metal pin, is fused in the sealing material 60, the glass plug connector together with the metal pin is introduced in the feedthrough opening 20. Subsequently, the glass plug connector together with the ring-shaped or plate-shaped element, that is, the base body, is heated, so that, after cooling, the metal of the ring-shaped or plate-shaped element shrinks onto the sealing material—in this case, the glass material—just like previously during the production of the glass plug connector, in which the contact pin, in particular the metal pin, is introduced in the glass plug connector. In this way, a pressure glazing with a tightness of $1 \cdot 10^{-8}$ mbar l/s at 1 bar pressure difference is provided. The contact pin serving as ground, in particular the metal pin 52, is connected to the plate-shaped element in a conductive manner by hard soldering. The soldering site is marked 70. All related metal pins are rounded at the end sections 72 by material-removing and/or material non-removing methods. In this way, no impurities are present on the surface of the contact pins, in particular the metal pins, so that the contact pins can be furnished with a coating, such as, for example, gold or also nickel, without any defects.

FIG. 3 shows a feedthrough 100 for an igniter in a three-dimensional view. Components identical to those in FIG. 2 are labeled with the same reference numbers. In contrast to FIG. 2, what is involved in FIG. 3 is not a schematic view, but rather a view of a specifically implemented exemplary embodiment. As in FIG. 2, the round-shaped and plate-shaped element 106 comprises two contact pins 50, 52, whereby, in contrast to FIG. 2, the contact pins 50, 52 are shown with a coating. Clearly seen is the coated section 220 of the metal pin. Components identical to those in FIG. 1 are marked with the same reference numbers. The plateau portion of the region 220 is marked with P as in FIG. 1. The dimensions are chosen as in the description in regard to FIG. 1. Likewise clearly seen in FIG. 3 is that, on the one hand, the coated metal pin 50 is passed through an opening of the base body 100 into a glass or glass ceramic material 20 and, on the other hand, the metal pin 52 is permanently connected with the base body by soldering, for example, and serves as the metal pin.

The contact pins coated in accordance with the disclosure have a low contact resistance and a good electrical conductivity. Because defects are prevented, it is possible to obtain a coating with gold (Au) in accordance with the disclosure in the section 200 of the end section of the metal pin 7 with a continuous surface that is largely free of defects. Alternatively to a direct coating of the metal pin with gold (Au), the metal pin can, first of all, be coated with nickel (Ni) as an adhesive layer and, subsequently, gold can be coated on the Ni layer in accordance with the coating profile for coatings of the prior art shown in FIG. 4 and in accordance with the disclosure. The plateau region 2300 of the coating has a length P and is depicted in FIG. 3. It is preferred when the nickel is applied by diffusion to the pin body prior to application of the gold layer. The diffused Ni layer results, on the one hand, in an increase in the adhesion of the gold layer and, on the other hand, also increased corrosion resistance, in particular of the coated pin.

The continuous surface of the coating ensures, in turn, that any corrosion can be largely excluded. The plateau region of the coating in accordance with the disclosure, which is marked with 2300, begins at a distance of 1 mm to 4 mm following the contact end or the end section 10.1 of the metal pin and extends over a length P of up to 10 mm, so that the plateau region 2300 ends at a distance of 2 mm to 8 mm from the end section 10.1, that is, from the tip of the metal pin. The maximum layer thickness of the gold coating in the plateau region with the length P lies between 0.2 μm and 0.8 μm, in particular between 0.4 μm and 0.7 μm. Outside of the plateau region towards the contact end 10.1, the layer thickness is only 0.05 μm to 0.20 μm. The application of the gold layer can be conducted in a gold-plating unit by using a selective brush technique, for example, with high selectivity.

The plot of the gold coating along the length L of the metal pin as a function of the distance from the end section or contact end 10.1, that is, the tip of the metal pin, is depicted in FIG. 4.

In FIG. 4, the thickness plots of the profile of the gold coating of two metal pins according to the prior art are marked 2000.1 and 2000.2, and the plot according to the disclosure is marked 2200.

The first profile 2000.1 in accordance with the prior art has, in the region of the tip of the metal pin, as shown in FIG. 4, a very great thickness of 0.75 to 0.65 μm. In the region of the plateau, which serves for contacting, the layer thickness decreases too rapidly and too intensely for the profile 2000.1 in accordance with the prior art, so that a secure contacting of a plug connector, for example, is not possible. This is due to the fact that, for the profile 2000.1 in the region of 3 mm to 6 mm distance from the tip of the metal pin, the layer thickness is only 0.3 μm, so that no adequately thick gold layer for a contacting is provided.

Although the second profile 2000.2 in accordance with the prior art shows in the plateau region from 3 mm to 6 mm an adequate thickness, so that a secure contacting is provided, the gold layer at a slight distance from the tip or at the tip is unnecessarily thick at 0.75 μm. In contrast to the prior art, the profile 2200 according to the disclosure shows, in the form of the profile 2000.2, similarly good properties in regard to the contacting, but, for this purpose, markedly less material is necessary than for the profile 2000.2 in accordance with the prior art.

As can be seen, in the plot 2200 at the contact end 10.1, that is, at the tip of the contact pin or the metal pin, the layer thickness of the coating of the disclosure for the solution in accordance with the disclosure is only 0.1 μm and increases in a largely linear manner up to a distance of 3 mm from the tip to more than 0.6 μm.

The plateau region 2300 with the length P in the plot 2200 of the metal coating in accordance with the disclosure is the contact region of the contact pin or metal pin with a plug connector, for example. In the contact region, other electrical components, such as, for example, plug connectors, are connected to the metal pin in an electrically conductive manner. On account of the relatively thick gold coating with a thickness of approximately 0.65 μm in the plateau region 2300, a very reliable connection of the metal pin to other electrical devices is made possible with low contact resistance. The plateau region 2300 in the plot 2200 of the coating is produced very selectively in accordance with the disclosure, in the region 3 mm to 6 mm from the tip of the metal pin, for example by masking in the gold-plating unit. In the plateau region, the gold coating has a largely constant thickness of 0.6 μm to 0.65 μm. The selective application of the gold layer, in particular in the plateau region 2300 of the plot 2200, is conducted preferably in a galvanic manner. After the plateau region 2300, the layer thickness decreases largely linearly, so that, after a length of 9 mm, a coating is no longer present.

In contrast to the prior art with the plot 2000.1, which, at the beginning of the pin, that is, in the contact end 10.1, has a layer thickness of more than 0.75 μm, it is possible by way of masking in the gold coating unit to produce a nearly rectangular plot of the coating, so that only the contact region of the metal pin is coated selectively in accordance with layer plot 2200, and this also results in significant material savings in comparison to the profile 2000.2 in accordance with the prior art.

Accordingly, the disclosure provides a contact pin or metal pin and a passenger protection device igniter having a contact pin or metal pin of this kind, which provide a geometrically defined connection region with a coating, in particular at least an Au coating, in particular for insertion into a plug connector system. Usually, the metal pin according to the disclosure is pushed into a plug connector. The latter has contact surfaces that are distant from the end of the contact pin or metal pin. The maximum layer thickness of the gold layer is present, in accordance with the disclosure, in the region of the contact surfaces. This makes possible a secure, that is, long-term stable contacting, which has a low contact resistance. In contrast to this, the layer thickness of the gold layer decreases towards the contact end or end section and is thinner there and, as a result, the contact resistance is higher there and the probability of corrosion is greater.

What is claimed is:

1. An igniter of a passenger protection device, the igniter comprising:
    a round, metal pin extending along a length thereof toward a contact end,
    wherein the contact end is not flat;
    a gold coating on a section along the length and about a circumference of the metal pin,
    a plateau region of the gold coating having a maximum thickness between 0.20 μm and 0.80 μm,
    wherein the maximum thickness varies by at most 40% of the maximum thickness,
    wherein the plateau region has a length between 2 mm and 6 mm and is located at least 1 mm from the contact end,
    wherein the gold coating has a thickness that increases, in a direction from the contact end towards the plateau region, by a slope of 0.1 to 0.3 μm per mm, and
    wherein the plateau region is configured to be electrically contacted.

2. The igniter according to claim 1, wherein gold coating has a thickness less than 0.20 μm outside the plateau region.

3. The igniter according to claim 2, wherein the gold coating has a thickness greater than 0.05 μm outside the plateau region.

4. The igniter according to claim 1, wherein the metal pin has a length of more than 7 mm, and wherein the gold coating has a thickness of more than 0.15 μm at 7 mm from the contact end.

5. The igniter according to claim 4, wherein the gold coating has a thickness, at 7 mm from the contact end, of less than 0.35 μm.

6. The igniter according to claim 1, wherein the metal pin has a length of 7 mm to 12 mm, and wherein the plateau region begins at 1 mm to 4 mm from the contact end.

7. The igniter according to claim 1, wherein the plateau region terminates at 5 mm to 10 mm from the contact end.

8. The igniter according to claim 7, wherein the plateau region terminates at 5.5 mm to 7.5 mm from the contact end.

9. The igniter according to claim 1, wherein the metal pin is arranged in a sealing material of a metal sealing-material feedthrough with a base body or is connected to the base body in an electrically conductive manner by a solder connection or a weld connection.

10. The igniter according to claim 1, wherein the contact end is round.

11. A method for producing the igniter of claim 1, the method comprising:
    applying the gold coating to the section over the length of the metal pin, wherein the gold coating is applied so that the plateau region extends a length of 2 mm to 8 mm and is formed on the metal pin beginning at a distance of 1 mm to 5 mm from the contact end of the metal pin;
    inserting the metal pin in a glass or glass ceramic material;
    inserting the glass or glass ceramic material alone or together with a base body into a housing opening of a housing of the igniter; and
    heating the glass or glass ceramic material while applying a pressure glazing.

12. The method according to claim 11, wherein the applying the gold coating to the metal pin is by electrolytic deposition.

13. The method according to claim 11, wherein the applying the gold coating is by a blend technique in a single coating step.

14. The method according to claim 11, the method further comprising:
    diffusing nickel into the metal pin prior to the applying the gold coating.

15. A passenger protection device selected from the group consisting of: airbags, seatbelt tensioners, buckle tensioners, pyrotechnic actuators, active hinges, active buckles, active headrests, active steering columns, and battery separators, the passenger protection device comprising:
    the igniter according to claim 1.

* * * * *